(12) United States Patent
Niemoeller et al.

(10) Patent No.: US 9,654,333 B2
(45) Date of Patent: May 16, 2017

(54) APPLICATION ALLOCATION IN DATACENTERS

(75) Inventors: Joerg Niemoeller, Sundbyberg (SE); Stephan Baucke, Milpitas, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 436 days.

(21) Appl. No.: 13/882,430

(22) PCT Filed: Oct. 6, 2010

(86) PCT No.: PCT/EP2010/064905
§ 371 (c)(1),
(2), (4) Date: Aug. 27, 2013

(87) PCT Pub. No.: WO2012/045338
PCT Pub. Date: Apr. 12, 2012

(65) Prior Publication Data
US 2013/0339528 A1   Dec. 19, 2013

(51) Int. Cl.
*G06F 15/173* (2006.01)
*H04L 29/08* (2006.01)
*G06F 9/50* (2006.01)

(52) U.S. Cl.
CPC ........ *H04L 29/08297* (2013.01); *G06F 9/505* (2013.01)

(58) Field of Classification Search
CPC .... G06F 9/505; G06F 2209/5015; G06F 9/50; H04L 29/08297; G06Q 10/0639
See application file for complete search history.

(56) References Cited

U.S. PATENT DOCUMENTS

| | | | | |
|---|---|---|---|---|
| 6,195,703 | B1 * | 2/2001 | Blumenau et al. | 709/238 |
| 7,725,603 | B1 * | 5/2010 | Kanevsky et al. | 709/245 |
| 8,612,627 | B1 * | 12/2013 | Brandwine | 709/240 |
| 8,793,308 | B2 * | 7/2014 | Pirzada | G06F 3/061 |
| | | | | 709/203 |
| 2004/0003029 | A1 | 1/2004 | Islam et al. | |

(Continued)

FOREIGN PATENT DOCUMENTS

CN    101156138 A    4/2008
WO    WO 2006/029771 A1    3/2006

OTHER PUBLICATIONS

International Search Report, Application No. PCT/EP2010/064905, Aug. 9, 2011.

(Continued)

*Primary Examiner* — Umar Cheema
*Assistant Examiner* — Anh Nguyen
(74) *Attorney, Agent, or Firm* — Sage Patent Group

(57) ABSTRACT

An allocation entity of a datacenter is provided, wherein said allocation entity being configured: to receive an application allocation request for allocating an application to one of a plurality of processing units of the datacenter, the application allocation request comprising application network load information; to acquire path network load information indicating network load of network paths to at least a part of the plurality of processing units; and to select a processing unit from the plurality of processing units for allocating the application based on the application network load information and the path network load information.

18 Claims, 6 Drawing Sheets

(56) References Cited

U.S. PATENT DOCUMENTS

2006/0271700 A1* 11/2006 Kawai ................. H04L 67/1008
  709/233
2010/0208697 A1* 8/2010 Hori et al. .................... 370/331

OTHER PUBLICATIONS

Written Opinion of the International Searching Authority, Application No. PCT/EP2010/064905, Aug. 9, 2011.
International Preliminary Report on Patentability, Application No. PCT/EP2010/064905, Dec. 6, 2012.

* cited by examiner

APPLICATION ALLOCATION IN DATACENTERS

CROSS REFERENCE TO RELATED APPLICATION

This application is a 35 U.S.C. §371 national stage application of PCT International Application No. PCT/EP2010/064905, filed on 6 Oct. 2010, the disclosure and content of which is incorporated by reference herein in its entirety. The above-referenced PCT International Application was published in the English language as International Publication No. WO 2012/045338 A1 on 12 Apr. 2012.

TECHNICAL FIELD

The present invention relates to application allocation in datacenters. Specifically, the present invention relates to an allocation entity of a datacenter, a method of operating an allocation entity of a datacenter, a computer program, a computer program product, as well as to a method of operating a datacenter and a to a datacenter as such.

BACKGROUND

Recently, datacenters have attracted considerable attention for their capability to provide remote and/or distributed execution of applications. Although the applications run remotely from the users, the latter may use, access, and operate the applications that can be run on virtual machines, from anywhere via networks, such as the internet.

In this context, the term cloud computing has been coined as being a form of internet-based computing, wherein shared resources, software, and information are provided to users over the internet. In other words, cloud computing can be seen as a new way of utilizing and marketing the capabilities of datacenters. In the latter, the applications actually run and the respective user data is processed. Typical to clouds is the usage of virtual machine images in which a set of applications is installed. Such an image is started on a server of a datacenter on demand. If the demand for a certain application changes, images of the same or a similar type which provide this application might be started or removed. Thus, the term application may specify the application as such or the virtual machine image (or simply image) on which one or more applications are running.

Datacenters are usually organized in a hierarchical way. As shown in conjunction with FIG. 1, a datacenter 1' comprises a plurality of processing units (so-called server blades) 10. These processing units 10 are coupled to some sort of datacenter access point via at least one switch level 200. The access point may be an external gateway or router, such as the shown gateway entity 30. In the shown structure, there are actually three switch levels 201, 202, 203, which constitute the hierarchical structure of the datacenter 1'. The processing units 10 that offer a usually virtualized platform for applications may be thus organized in racks which—in turn—are organized in rows which—in turn—are organized in so-called sections. For example the hierarchy of the sections would correspond to the switch level 201, the hierarchy of the rows would correspond to the switch level 202, and the hierarchy of the racks would correspond to the switch level 203. Data paths 40, which can also be referred to as network paths lead to each of the processing units 10.

Central routers, such as the gateway entity 30, connect the entire datacenter 1' to an external network like the internet and distribute the data traffic within the datacenter to the hierarchical levels. For this purpose, there are provided subsequent switches or routers that distribute the data traffic within the datacenter. In the shown example, section switches distribute the data traffic to rows. Row switches distribute to racks and finally rack switches connect to the server blades or processing units to the rest of the data center.

As an option, the above-described hierarchical structure in datacenters can also be accompanied by additional direct short-cuts between parts of the datacenter, which are introduced in order to increase the internal networking capabilities. For example, two rack router switches 23 may also communicate directly to each other, despite a respective communication via the associated row router switch 22. Also, the number of hierarchy levels might vary depending on size and complexity of the datacenter.

In order to run applications that have significant demands on networking capabilities, the datacenters and its components (hierarchical levels, switches, routers, etc.) should provide sufficient network communication capabilities for meeting the application's demands on communication traffic. This may imply that the one processing unit where an instance of the application (or image) is physically executed needs to be coupled via a network path through the datacenter hierarchy and the external interconnection (gateway) to the internet that satisfies the networking needs of the applications. Depending on the application and image these networking needs could be, for example, a certain minimum data transmission bandwidth.

When allocating an application within a datacenter the processing demands of the image and its applications are considered. The application/image is started on a server blade where sufficient processing capacity is available. The networking demands as described above are usually only considered with a best effort strategy: A rough categorization in high and low networking capabilities is done and used in application allocation. This can lead to the situation that an application would be in principle able to process its tasks, but its communication with other parts of the datacenter or external users might be congested. The result would be a bad utilization of the processing capabilities and finally a bad user experience. In many application scenarios, where the user experience and responsiveness of an application or service is a key performance indicator, this situation in not acceptable. This is, for example, the case for telecommunication services. This situation may lead to disadvantages, if other parts of the datacenter would have sufficient networking capacity in order to serve the application's demands. In this case a different allocation of the image and application within the datacenter would result in a significantly improved overall service.

SUMMARY

The above problems are solved by the subject-matter of the independent claims. Preferred embodiments of the present invention are defined in the dependent claims.

The object of the present invention is to provide an improved concept of application allocation in datacenters. In particular, it is an object of the present invention to account for the network load that is required by an application for selecting a suitable processing unit within a datacenter. Accordingly, it is another object of the present invention to provide an improved method of operating a datacenter and an improved datacenter as such. Further, it is an object of the present invention to provide an according method of operating such an allocation entity and to provide respective computer programs and computer program products.

According to an aspect of the present invention there is provided an allocation entity of a datacenter, said allocation entity being configured: to receive an application allocation request for allocating an application to one of a plurality of processing units of the datacenter, the application allocation request comprising application network load information; to acquire path network load information indicating network load of network paths to at least a part of the plurality of processing units; and to select a processing unit from the plurality of processing units for allocating the application based on the application network load information and the path network load information.

According to a second aspect of the present invention there is provided an allocation entity of a datacenter comprising: receiving an application allocation request for allocating an application to one of a plurality of processing units of the datacenter, the application allocation request comprising application network load information; acquiring path network load information indicating network load of network paths to at least a part of the plurality of processing units; and selecting a processing unit from the plurality of processing units for allocating the application based on the application network load information and the path network load information.

According to a third aspect of the present invention there is provided an allocation entity of a datacenter comprising: receiving an application allocation request for allocating an application to one of the plurality of processing units, the application allocation request comprising application network load information; acquiring path network load information indicating network load of network paths to at least a part of the plurality of processing units; and selecting a processing unit from the plurality of processing units for allocating the application based on the application network load information and the path network load information.

According to a fourth aspect of the present invention there is provided an allocation entity of a datacenter comprising a plurality of processing units; network paths to at least a part of the plurality of processing units; and an allocation entity according to respective embodiments of the present invention.

According to further aspects of the present invention, a computer program is provided that comprises code loadable into a code execution unit of an allocation entity according to an embodiment of the present invention, wherein the code executes a method as described in conjunction with the present embodiments. Further, still another aspect of the present invention is to provide a computer program product that comprises an above computer program.

BRIEF DESCRIPTION OF THE DRAWINGS

Embodiments of the present invention, which are presented for better understanding the inventive concept but which are not to be seen as limiting the invention, will now be described with reference to the Figures, in which.

DETAILED DESCRIPTION

Figure 1:
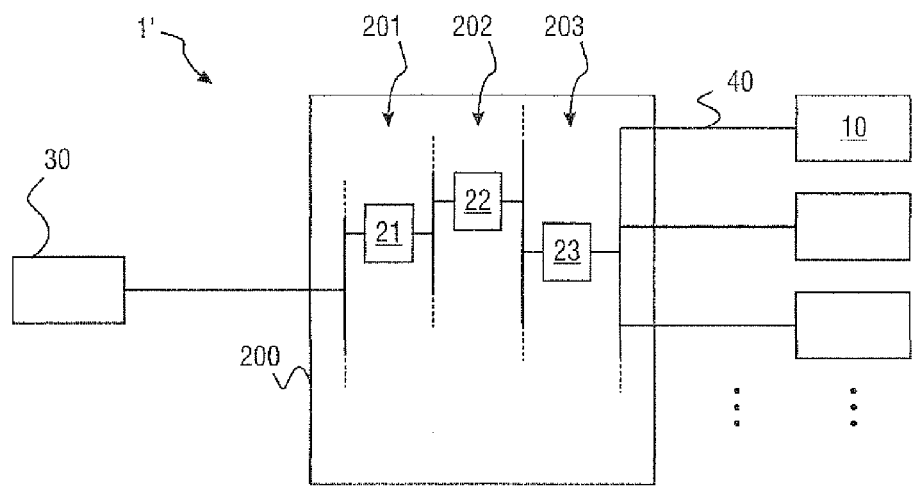
FIG. 1 shows a schematic representation of a conventional datacenter.

Within the present invention, a so-called application may identify an application in the conventional sense, i.e. an application program that is executed in order to provide a desired functionality to a user. Such functionalities include text processing, spread sheet calculating, data bases and management, processing/generation/management of image and graphical data, and the like. However, the term application can also identify an image that is to be understood as a so-called virtual machine. Virtual machines are a set of software providing one virtual processing entity on another, i.e. a physical one. For example, a virtual machine may be a virtual Windows™ computer which is actually running on a computer that employs a Linux-based operating system. However, the operation systems between the virtual machine and the processing unit which run the virtual machine may not be necessarily different to each other. Nevertheless, the virtual machine is characterized in that it provides one encapsulated entity for execution of applications to one or more users, wherein the execution of the applications and the running of the virtual machine as such does not interfere—at least in some given limits— with other virtual machines running on the same processing unit.

Within the present invention, the processing units are to be understood as one unit for processing data and/or communication in a datacenter. The aforementioned, so-called server blades may constitute one of such a processing unit. However, a processing unit can also be a stand-alone PC or server of which a plurality is arranged interconnected with each other to form a datacenter. Said interconnection can be employed by means of at least on switch level, usually, however, the switch levels correspond to the physical setup of the plurality of processing units, i.e., sections, rows, racks, and the like. The processing unit, however, may also limit its respective capabilities to data forwarding, routing and/or switching. Therefore, a processing unit can also be understood as a switch or router entity which does not for itself run an image, but the application may be such to constitute a router/switch entity when running on a processing unit.

As already explained, data centers employ at least one switch level that may reflect the physical setup of the plurality of processing units. If, for example, the processing units are mounted in racks, the racks—in turn— are arranged in rows, and wherein a plurality of such rows then constitutes so-called sections, there will be at least three such switch levels, for example denoted by a section switch level, a row switch level, and a rack switch level. Between two switching/routing entities of different switch levels there is at least one connection for data communication. The part of the connection between two such entities of two different or adjacent switch levels can be denoted as a so-called network sub-path, wherein a so-called network path is defined to end at one specific processing unit from the plurality of processing units.

In other words, the network path is a possible path for data that is scheduled for or from a specific processing unit. A network path may—at the other end—end at another processing unit or at some sort of central access point, such as the aforementioned gateway entity. Thus, the other end of the network path may be defined according to requirements and required dataflow. For example, the network path may be formed between the respective processing unit and some sort of high-level access point, if data is to be routed from and to the respective processing unit to, say, the internet. However, a network path may also remain well inside one datacenter, for example when connecting two different processing units. Such dataflow can become necessary if, for example, one application is distributed among several processing units or, when one application interacts with another application running on another processing unit. An example could be a web server running as a first application on a first processing unit and a video stream server running as a second application on a second processing: The two server application may interact in that the web server employs the video stream server for providing web-based video stream applications.

In the above-mentioned setup of several switch levels, there is usually a tree-like path structure, i.e. one switch/router entity of one switch level receives and sends data to one entity of a higher switch level, whereas there is a fanout of several connections toward entities of a lower switch level from the one switch/router entity. In this way, a selection at each switch level of one of the fanout possibilities defines a network path to a specific processing unit, as also explained more comprehensively in the following.

According to aspects of the present invention, it can be allowed for taking the networking capacity of the datacenter into account when adding application/image instances to a datacenter. In particular, the current communication load of parts of the datacenter and the locally and temporarily available networking capacity can be considered. This allows for a better distribution of networking load within the datacenter and it can avoid bottleneck situations that might cause a bad user experience when using the applications and services provided by the datacenter.

Further, aspects of the present invention also allow for the (soft) reservation of capacity throughout the datacenter, thus being able to offer service level agreements (SLA) in a much more controlled way than the usual best effort approach would allow. This can provide several advantages compared to datacenters without this possibility, where SLA guarantees can be given in a very conservative and cautious way, if at all.

Figure 2:
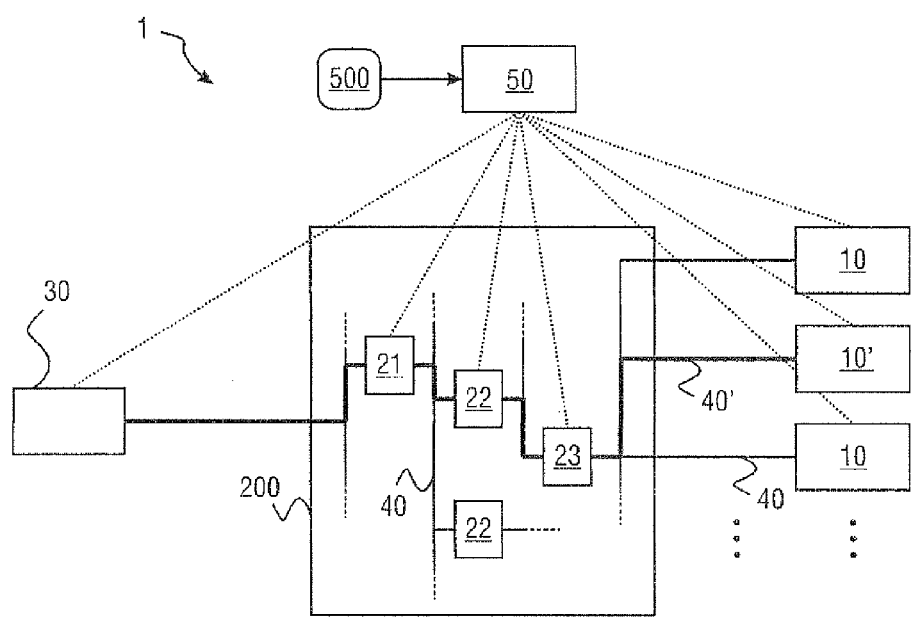
FIG. 2 shows a schematic representation of a datacenter with an allocation entity according to an embodiment of the present invention.
Figure 4:
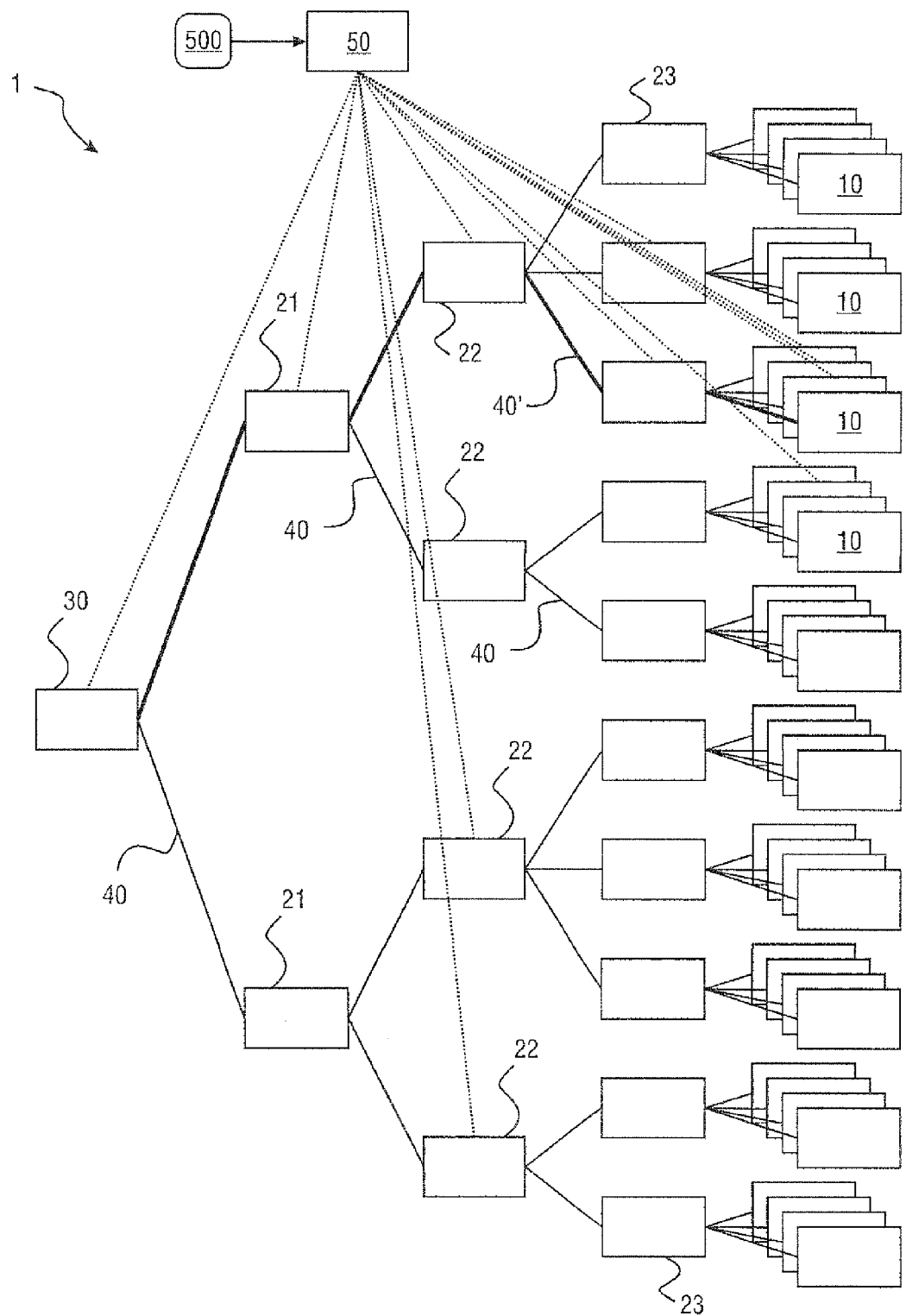
FIG. 4 shows at greater detail a schematic representation of a datacenter with an allocation entity according to another embodiment of the present invention.

FIGS. 2 and 4 show a schematic view of a datacenter according to an embodiment of the present invention. A plurality of processing units 10 is coupled via at least one switch level 200 to a gateway entity 30. As already described above, the switch level 200 may actually comprise more than one switch level that corresponds to the actual physical setup of the processing units 10 (section level, row level, rack level, and the like). The switch levels may be represented by the respective switch entities, such as the section switches 21, the row switches 22, and the rack switches 23.

According to this embodiment, there is provided an allocation entity 50 in the datacenter 1 receiving data and/or information from the gateway entity 30, the one or more switch levels 200, and the processing units 10. By means of said received data, the allocation entity 50 can gather information on all network paths 40 connecting the gateway entity 30 to the respective processing entities 10. More specifically, the allocation entity 50 may gather information on the actual, predicted or scheduled network load between the gateway entity 30 and each of the processing units 10. Said information may concern the present and/or given intervals and/or points of time in the future. In other words, the allocation entity 50 is configured to acquire path network load information that indicates network load of the network paths to at least a part of the plurality of processing units 10.

Further, the allocation entity 50 is configured to receive an application allocation request 500 for allocating an application to one of datacenter's 1 plurality of processing units 10. The application allocation request 500 comprises so-called application network load information that characterizes the application which is to be allocated to one of the plurality of processing units 10 in terms of the required network load that is required for proper operation and/or caused by the application. Said proper operation may also be defined in terms of a guaranteed quality of service (QoS) or specified maximum response time.

Moreover, said application allocation request or said application network load information may comprise so-called application network load profiles that specify the required network load in terms of events, specific points and intervals of time, and the like. In this way, the allocation entity 50 may become aware of how much network load a specific application, being requested for allocation, requires or causes at specific points in time.

Hence, the allocation entity 50 is able to select a specific processing unit 10' which is coupled to the gateway entity 30 via one specific network path 40' which satisfies the requirements as set out by the application network load information. For example, the allocation to be allocated to one of the plurality of processing units 10 can be a video stream server that requires substantial network load, since video data volume is usually large. Aware of the actual network requirements of this application, the allocation entity 50 may select the processing unit 10' for allocating the application, since its respective network path 40' is able to handle the required network load at present, in the future, or at specific times and intervals of time in the future.

In other words, it is introduced the allocating entity 50 as a new node (i.e. a traffic aware application/image allocator), which allows to find a suitable allocation for application/images within a datacenter. In order to do so, this node collects data about the life networking load situation on all networking links within the datacenter. This information is collected using traffic measurement interfaces of the routers and switches. If a new application/image needs to be allocated the allocation entity 50 may perform a search pattern that starts at the external interconnection node of the datacenter (gateway entity 30) and proceeds through the hierarchy of networking nodes/switches towards the server blades (in the shown example, the processing unit 10') by taking the path of the lowest networking load.

In this way, also a load aware management layer is introduced. This layer keeps virtual mirror images of the datacenter structure, thus a model of the datacenter, together with the momentary networking load situation. Furthermore, the allocated applications/images are accompanied with corresponding application network load information or a corresponding networking load profile. This is a description of the networking load requirements of the application.

When allocating an application in the datacenter, the load aware management layer virtually reserves networking load for this applications all the way through the datacenter according to the load profile. If the traffic aware image allocator performs its search pattern on the virtual datacenter model rather than the actual datacenter, the reservations and potential load need of other images according to their networking load profile can be taken into account in order to find an optimized location, i.e. the processing unit 10', for the application.

In general, despite the networking aspects of the decision where in the datacenter to allocate an application, there may be, of course, many other criteria that may influence this decision. The entities and methods proposed by the present invention provide contributions towards the overall decision process.

Figure 3:
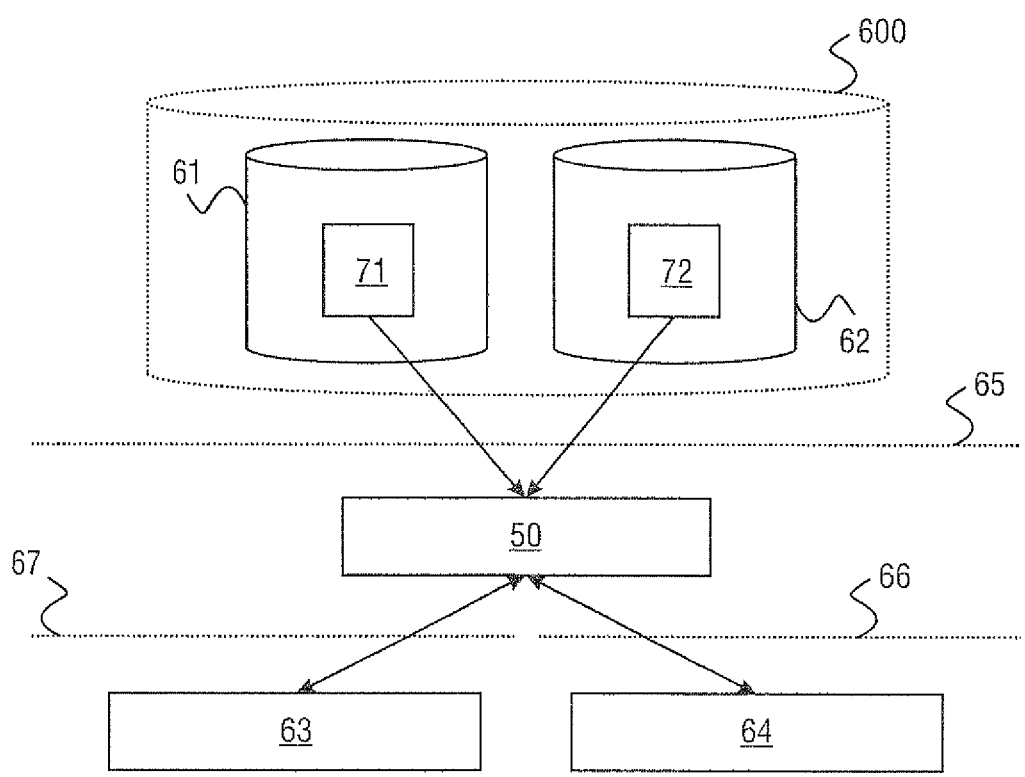
FIG. 3 shows a schematic representation of interaction of an allocation entity according to another embodiment of the present invention.

Now with reference to FIGS. 3 and 4, the allocation entity 50 has an interface to the switches/routers 21, 22, 23 and processing units 10 within the hierarchical and tree like network structure of the datacenter 1. Furthermore, the allocation entity 50 has an interface 66 to the datacenter management system 64. Through this interface 66 the allocation entity 50 can receive orders to search for a location where a new application might be allocated within the datacenter 1. The result of this search is communicated back to the datacenter management which in turn can allocate the application/image accordingly.

In order to get information about the requirements of the application, the allocation entity 50 has interfaces 65 to the repository of applications and or images, where they are stored or described, i.e. a data storage 600. The interface 65 can be constituted by the application/image management API (application programming interface). In addition to the usually stored information about such an application (code, application data and libraries 71 in data storage 61) it is introduced application network load information 72 which is associated to an application/image in order to provide additional information about the requirements in particular regarding network load. Said information 72 can be stored in a separate data storage 62, or both the application data 71 and the information 72 can be stored in one single common data storage 600.

A source of information lies in the availability of interfaces 67 to the datacenter's network nodes 63, which allow for retrieval of current live network load situation on all nodes and its network links, i.e. the involved switches 21, 22, 23, the gateway entity 30, and the processing units 10. Therefore, at least a part of the nodes and links is coupled to the allocation entity 50 in order to provide such information (dashed lines in FIGS. 2 & 4).

In one embodiment, the allocation entity 50 could proactively request instantaneous information about the load situation of the nodes and links it currently considers/observes, or, in another embodiment, it could regularly poll the load information from the entire datacenter 1 and store it to be used in the search algorithm. In still another embodiment, the allocation entity 50 could be registered at the datacenter's network nodes, i.e. all the involved switches 21, 22, 23, in order to receive regular updates on network load information. Moreover, these concepts of retrieval and handling of the load situation could be combined and different parts of the datacenter 1 could be handled differently.

When a new application or virtual image on which the application is installed shall be added to the datacenter 1, the allocation entity 50 participates in the decision where in the datacenter 1 the application/image shall be allocated. It finds a suitable processing unit 10 with highest vacant networking capacity in the datacenter 1 and, in particular, with vacant and suitable capacity on the entire network path 40' from the processing unit 10 towards the external, i.e. the gateway entity 30. The order to perform this search usually comes from the datacenter management 64 and the result is reported back to the datacenter management 64. This allows the datacenter management system 64 to take network load into account when allocation new instances of applications/images.

As already mentioned above, the application/image can also be accompanied with a profile describing its networking load needs. In one embodiment such a load profile could for example be stored in a separate file 72 within a repository of such load profiles. i.e. data storage 62. In this case a suitable profile is selected individually for each application/image. In another embodiment, the application network load information might be stored together with the application/image or even within a section of the image file or the image description.

A profile of the application network load information can contain information like a required minimum bandwidth, or a maximum bandwidth which will never be exceeded. However, the profile can also contain information about conditional or temporal bandwidth figures. For example, separate bandwidth requirements could be provided for different times of the day or different days of the week. This load profile can be used by the allocation entity 50 in order to decide, if the network link to be selected is suitable to support all the requirements of the application/image which is supposed to be deployed in the datacenter 1. Said application network load profile can be extended to contain also requirements on other aspects of the application/image, which do not concern networking. For example, processing capacity needs could be specified here together with the networking needs.

Figure 5:
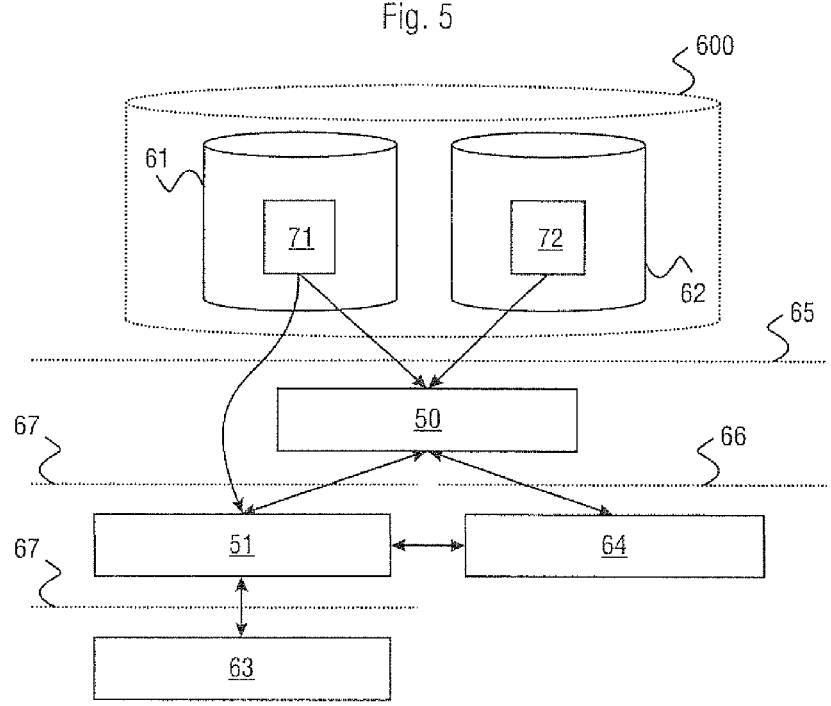
FIG. 5 shows a schematic representation of interaction of an allocation entity according to another embodiment of the present invention.
Figure 6:
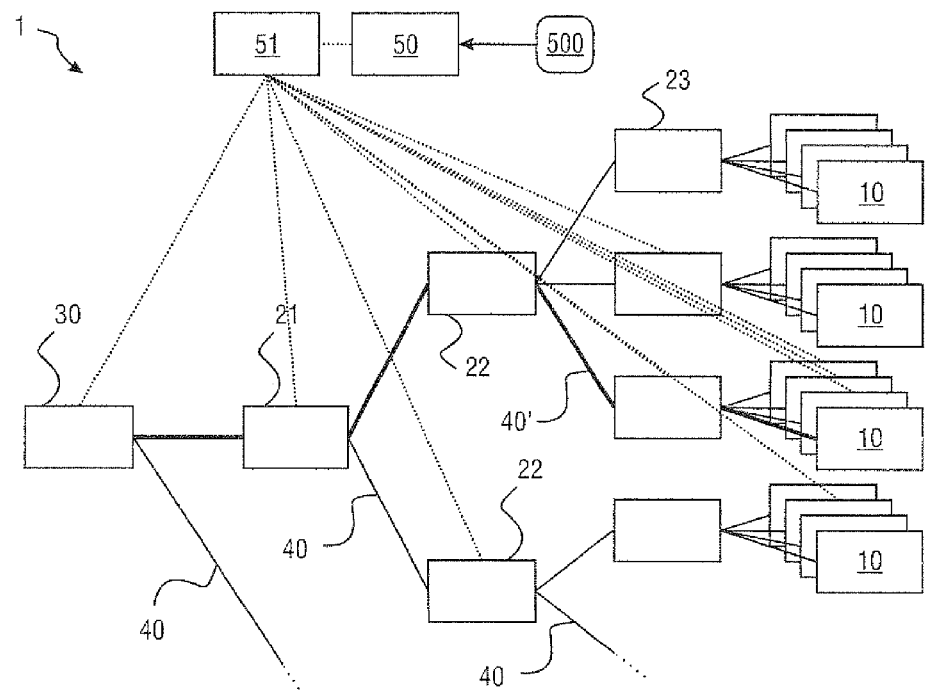
FIG. 6 shows at greater detail a schematic representation of a datacenter with an allocation entity according to another embodiment of the present invention.

Now with reference to FIGS. 5 and 6, also a datacenter load controller 51 can be provided in the allocation entity 50. The datacenter load controller 51 establishes an intermediate layer in the measurement of the datacenter network load. The datacenter load controller 51 can store a map of the datacenter topology together with figures of the current load situation. For each physical node of the datacenter and each link within the datacenter nodes the datacenter load controller keeps information about its networking load situation. Again, said nodes may be constituted by the switches 21, 22, 23, the entity 30, and/or the units 10. Said links may constitute the above-mentioned sub-paths. In this way, the datacenter load controller 51 maintains an abstract image of the real datacenter load situation. The retrieval of information and continuous update of the load figures can be done similarly to what is described together with the other embodiments of the present invention.

With this intermediate layer in place, the allocation entity 50 would not directly receive load figures from the actual datacenter nodes, but from the datacenter load controller 51 taken from the abstract datacenter map it maintains. Other than this change in the algorithm of finding a location for the new application/image stays may remain the same.

This embodiment is based on the abstract image of the datacenter rather than the datacenter itself. Based on its abstract image of the datacenter 1, the datacenter load controller 51 can perform reservation of network capacity per node and link. For this purpose, the datacenter load controller 51 can receive or obtain path network reservation information. It is noted that an application instance is finally deployed on the datacenter 1 and it is also informed about the network path 40' that was found for this application instance. The datacenter load controller 501 accesses the respective application network load profile (or in general, the application network load information) of the application, once an instance of is deployed and stores this network load profile at all of the virtual datacenter nodes and virtual datacenter links along the path 40' that was selected for supplying this application instance with networking service.

If the allocation entity 50 searches for a location for a new application instance, the presented load figures per node and link can then be either the life (current) load, or it can be the potential load based on the accumulated requirements as defined in the load profiles stored within the datacenter load controller 51. Also a combination of live load figures and accumulated requirements can be used.

In this way, a soft reservation of network capacity can be reached, because the capacity required by already deployed application instances is taken into account when allocation new applications. Paths 40 with already a high potential demand on networking can be refused for new deployments, although the current load situation would indicate that capacity is left. The datacenter load controller 51 knows that the applications served by this path have a potentially high demand. As a result, future bottlenecks can be avoided.

As network load profiles can provide complex figures which, for example, distinguish load requirements at different times and dates, this can also be taken into account when deciding whether a certain node or link would be able to take the load of another application. Not only current requirements can be matched, but also future requirements. The datacenter load controller 51 needs to be informed about all image deployments and removals by the datacenter management. If an application instance is removed or moved, the correspondingly stored paths together with the assigned network load profile needs to be removed or rearranged.

Figure 7:
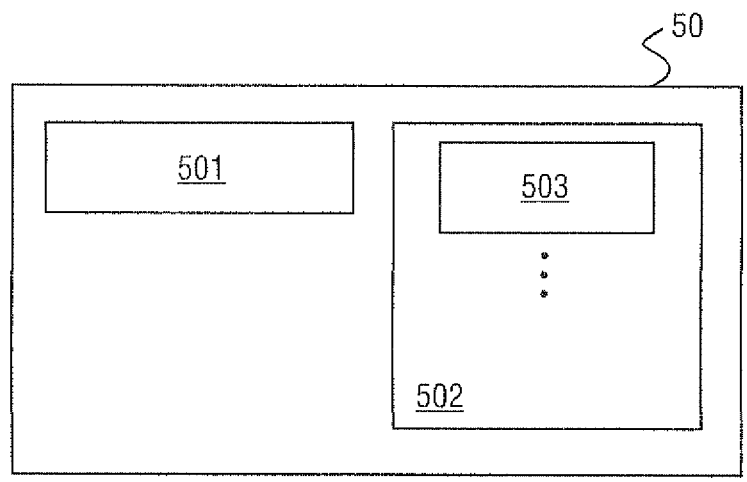
FIG. 7 shows a schematic representation of an allocation entity according to another embodiment of the present invention.

FIG. 7 shows a schematic view of an allocation entities internal setup according to another embodiment of the present invention. The allocation entity 50 comprises a processor 501 and a memory 502. The processor executes code that is stored as units 503 in the memory 502. Thus, any feature of an entity or any step of a method as described in conjunction with the embodiments of the present invention, can be realized or performed by the units 503, in that its respective code is executed by the processor 501.

Figure 8A:
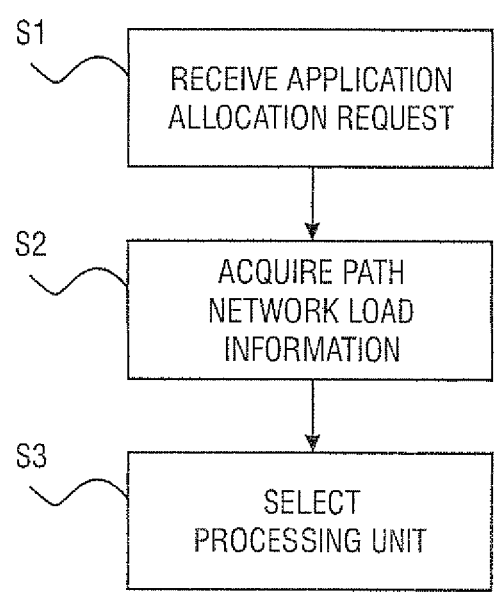
FIG. 8A shows a schematic flowchart of a method embodiment of the present invention.

FIG. 8A shows a schematic flowchart of a method embodiment of the present invention. Accordingly, in a step S1 it is received an application allocation request for allocating an application to one of a plurality of processing units of a datacenter. The application allocation request comprises application network load information. Further, in step S2, there is acquired path network load information indicating network load of network paths to at least a part of the plurality of processing units. Finally, there is selected in step S3 a processing unit from the plurality of processing units for allocating the application based on the application network load information and the path network load information.

Figure 8B:
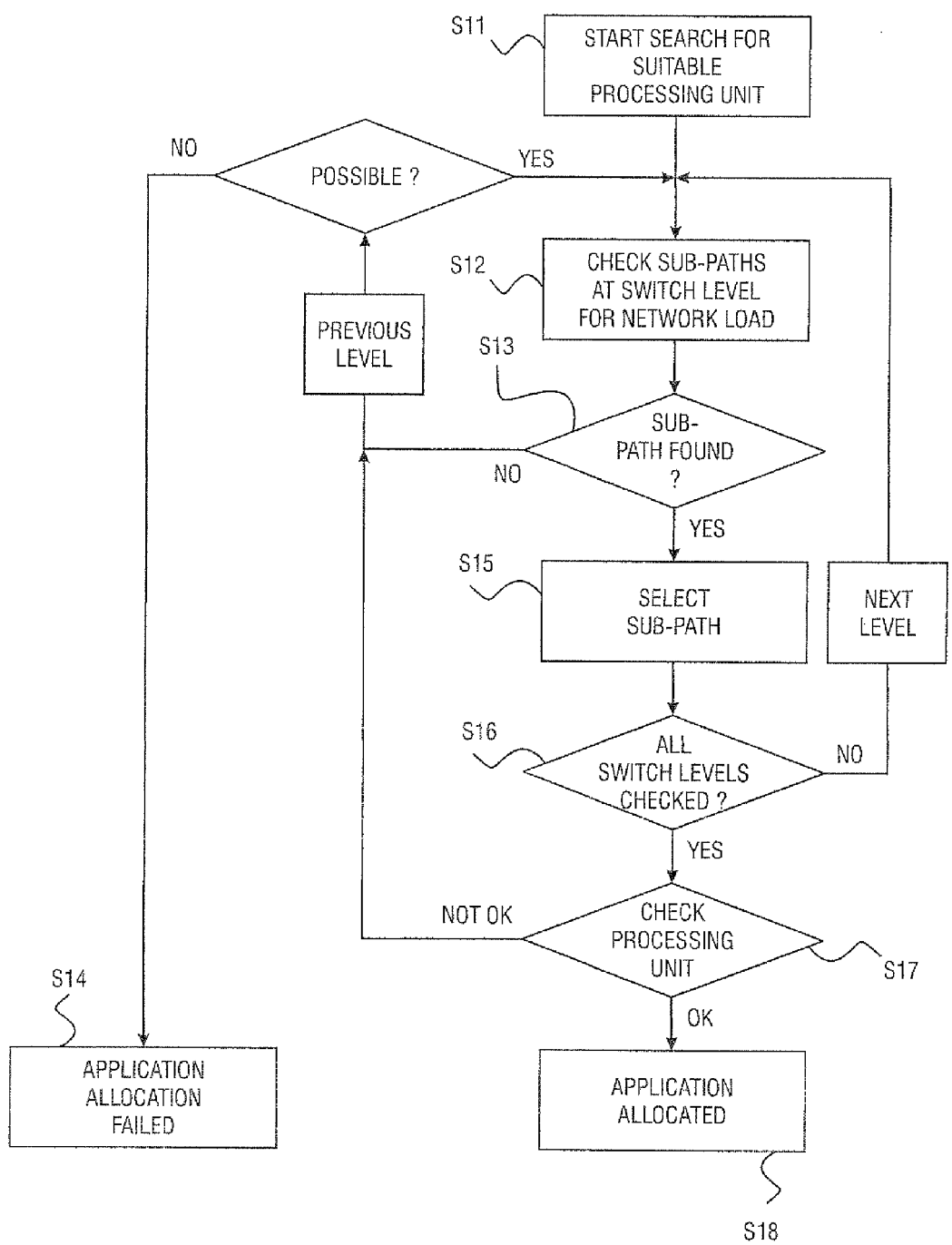
FIG. 8B shows a schematic flowchart of a method embodiment of the present invention.

FIG. 8B shows a schematic flowchart of another method embodiment of the present invention. This embodiment describes a possible method for searching a suitable processing unit for a particular application to be allocated in a datacenter. According to this embodiment, the search for a suitable processing unit starts at the gateway entity of the datacenter in a first step S11. Then, the allocation entity checks the load situation on all paths towards subsequent nodes/routers/switches in step S12. Based on this situation, the allocation entity selects in step S15 the link (sub-path) towards the subsequent node, i.e. the switch of the next hierarchy level, with highest vacant capacity, which was also not yet tried before in this search process.

If no link with sufficient vacant networking capacity is found in S13 within the currently checked node/router/switch the search returns back to the previous network node and step S12 of this algorithm. If this is not possible because there is no previous network node/router/switch of higher hierarchical level, the search has failed and the application cannot be allocated within the datacenter (S14). If the subsequent node behind the selected link is again a router/switch, the algorithm continues in step S12. If, however, the subsequent node behind the selected link is a processing unit, this unit is checked in step S17 if it meets all requirements of the application/image to be allocated. This might check not only the networking load situation of the processing unit, but could, for example, also take into account processing load or memory utilization. If the found processing unit meets all requirements in step S17, the application is allocated/deployed on this processing unit in step S18.

If, however, the found processing unit does not meet all requirements in step S17, the search returns back to the previous network node and step S12 of this algorithm. If this is not possible because there is no previous network node/router/switch, the search has failed and the application/image cannot be allocated within the datacenter (again, S14).

The above algorithm is able to find a suitable allocation for applications/images with high networking demands towards the external network, for example the public internet. A modified algorithm can be provided for finding suitable allocation of applications/images with high networking demands towards other parts of the datacenter. In this case the search would start in step S11 at the processing unit towards which the application/image to be applied has a high networking demand. The presented algorithms contain a check if the available capacity of a link does sufficiently support the requirements of the application/images to be allocated. The application/image load profiles as described can be used to determine information on these requirements. If such information is not available, the algorithm can also just select the best path, without controlling if its capacity would be sufficient.

In the above-described embodiments of the present invention, at least the following modifications are envisaged: According to a modification, the allocation entity may be implemented such to run on the datacenter, i.e. as code being executed by one or more processing units of the datacenter.

Although detailed embodiments have been described, these only serve to provide a better understanding of the invention defined by the appended claims, and are not to be seen as limiting.

The invention claimed is:

1. An allocation entity of a datacenter, said allocation entity comprising at least one processor and a memory coupled to the at least one processor executing program code in the memory to perform operations:
   to receive an application allocation request for deploying an application or a virtual image on which the application is installed onto one of a plurality of processing units of the datacenter, the application allocation request comprising application network load information that describes the application's demands on communication traffic in the datacenter after the application or the virtual image has been deployed onto the one of the plurality of processing units;

to acquire path network load information that indicates a network load of network paths to at least a part of the plurality of processing units; and to select a processing unit from the plurality of processing units for deploying the application or the virtual image based on the application network load information and the path network load information;

to select the processing unit by comparing the application network load information to path network load information of network paths to each one of the plurality of processing units; and to select the processing unit based on a least network load of the network paths to each one of the plurality of processing units.

2. The allocation entity of claim 1, wherein the network paths couple a gateway entity of the datacenter to the plurality of processing units over at least one switch level, and wherein the operations are further configured:

to acquire sub-path network load information indicating network load of network sub-paths between the gateway entity and the plurality of processing units; and to select one of the processing units from the plurality of processing units for deploying the application based on the sub-path network load information of a sub-path coupled to the one processing unit.

3. The allocation entity of claim 2, the operations further configured:

to determine whether a further sub-path coupled the one processing unit is available based on the application network load information; and to select another processing unit from the plurality of processing units for deploying the application or the virtual image based on the further sub-path not being available.

4. The allocation entity of claim 1, the operations further configured:

to receive path network reservation information; and to select the processing unit from the plurality of processing units also based on the path network reservation information.

5. The allocation entity of claim 1, the operations further configured to select a further processing unit from the plurality of processing units for deploying a further application or virtual image based on further application network load information and the path network load information.

6. The allocation entity of claim 1, wherein the application network load information comprises an application network load profile.

7. The allocation entity of claim 1, being implemented as an application running on or more processing units of the datacenter.

8. A method of operating a network entity of a datacenter, said method comprising:

receiving an application allocation request for deploying an application or a virtual image on which the application is installed onto one of a plurality of processing units of the datacenter, the application allocation request comprising application network load information that describes the application's demands on communication traffic in the datacenter after the application or the virtual image has been deployed onto the one of the plurality of processing units;

acquiring path network load information that indicates a network load of network paths to at least a part of the plurality of processing units; and selecting a processing unit from the plurality of processing units for deploying the application or the virtual image based on the application network load information and the path network load information;

selecting the processing unit by comparing the application network load information to path network load information of network paths to each one of the plurality of processing units; and selecting the processing unit based on a least network load of the network paths to each one of the plurality of processing units.

9. The method of claim 8 being adapted to an allocation entity comprising a processor and a memory coupled to the processor.

10. A computer program comprising a non-transitory medium having executable program code stored thereon, the executable program code loadable on at least one processor to cause the at least one processor to execute the method of claim 8.

11. A method of operating a datacenter comprising a plurality of processing units, said method comprising:

receiving an application allocation request for deploying an application or a virtual image on which the application is installed onto one of the plurality of processing units, the application allocation request comprising application network load information that describes the application's demands on communication traffic in the datacenter after the application or the virtual image has been deployed onto the one of the plurality of processing units;

acquiring path network load information that indicates a network load of network paths to at least a part of the plurality of processing units; and selecting a processing unit from the plurality of processing units for deploying the application or the virtual image based on the application network load information and the path network load information;

selecting the processing unit by comparing the application network load information to path network load information of network paths to each one of the plurality of processing units; and selecting the processing unit based on a least network load of the network paths to each one of the plurality of processing units.

12. The method of operating a datacenter of claim 11, wherein the datacenter comprises a gateway entity and at least one switch level, the plurality of processing units being coupled via network paths over the at least one switch level to said gateway entity, the method further comprising:

acquiring sub-path network load information indicating network load of network sub-paths between the gateway entity and the plurality of processing units; and selecting one of the processing units from the plurality of processing units for deploying the application based on the sub-path network load information of a sub-path coupled to the one processing unit.

13. The method of claim 12, further comprising:

determining whether a further sub-path coupled the one processing unit is available based on the application network load information; and selecting another processing unit from the plurality of processing units for deploying the application based on the further sub-path not being available.

14. The method of claim 11, further comprising:

receiving path network reservation information; and selecting the processing unit from the plurality of processing units also based on the path network reservation information.

15. The method of claim 11, further comprising selecting a further processing unit from the plurality of processing units for deploying a further application or virtual image based on further application network load information and the path network load information.

16. A datacenter comprising:
a plurality of processing units;
network paths to at least a part of the plurality of processing units; and
the allocation entity of claim 1.

17. The method of claim 8, wherein the network paths couple a gateway entity of the datacenter to the plurality of processing units over at least one switch level, the method further comprising acquiring sub-path network load information indicating network load of network sub-paths between the gateway entity and the plurality of processing units; and
   selecting one of the processing units from the plurality of processing units for deploying the application based on the sub-path network load information of a sub-path coupled to the one processing unit.

18. The method of claim 17, further comprising:
determining whether a further sub-path coupled the one processing unit is available based on the application network load information; and
selecting another processing unit from the plurality of processing units for deploying the application or the virtual image based on the further sub-path not being available.

* * * * *

UNITED STATES PATENT AND TRADEMARK OFFICE
CERTIFICATE OF CORRECTION

PATENT NO. : 9,654,333 B2
APPLICATION NO. : 13/882430
DATED : May 16, 2017
INVENTOR(S) : Niemoeller et al.

Page 1 of 1

It is certified that error appears in the above-identified patent and that said Letters Patent is hereby corrected as shown below:

In the Specification

In Column 2, Line 45, delete "in not" and insert -- is not --, therefor.

In Column 2, Line 67, delete "according method" and insert -- according to method --, therefor.

In Column 4, Line 31, delete "Windows™" and insert -- Windows (TM) --, therefor.

In Column 4, Line 35, delete "different to each" and insert -- different from each --, therefor.

In Column 4, Line 49, delete "least on" and insert -- least one --, therefor.

In Column 7, Line 30, delete "and or" and insert -- and/or --, therefor.

In Column 9, Line 2, delete "datacenter load controller 501" and insert -- datacenter load controller 51 --, therefor.

Signed and Sealed this
Ninth Day of April, 2019

Andrei Iancu
*Director of the United States Patent and Trademark Office*